Feb. 2, 1960     F. R. MERRIAM, JR., ET AL     2,923,830
STARTER MOTOR

Filed Sept. 12, 1958     3 Sheets-Sheet 1

F. R. MERRIAM, Jr.
A. M. PENTLAND
INVENTOR.

BY E. C. McRae
T. K. Oster
K. L. Zerschling
ATTORNEYS

Feb. 2, 1960  F. R. MERRIAM, JR., ET AL  2,923,830
STARTER MOTOR
Filed Sept. 12, 1958  3 Sheets-Sheet 2

F. R. MERRIAM, Jr.
A. M. PENTLAND
INVENTOR.

BY E.C. McRae
T.H. Oster
K.L. Berschling
ATTORNEYS

Feb. 2, 1960  F. R. MERRIAM, JR., ET AL  2,923,830
STARTER MOTOR
Filed Sept. 12, 1958  3 Sheets-Sheet 3

F. R. MERRIAM, Jr.
A. M. PENTLAND
INVENTOR.

BY
ATTORNEYS

United States Patent Office 2,923,830
Patented Feb. 2, 1960

2,923,830

STARTER MOTOR

Frank R. Merriam, Jr., Plymouth, and Alex M. Pentland, Ann Arbor, Mich., assignors to Ford Motor Company, Dearborn, Mich., a corporation of Delaware Application September 12, 1958, Serial No. 760,693

8 Claims. (Cl. 290—38)

This invention relates to an internal combustion engine starter motor and more particularly to a starter motor which utilizes the field coils in the starter motor to effect the engagement of the starter pinion with engine crankshaft turning means.

The present invention is intended as an improvement over the starter motor of United States Patent 2,813,206 issued November 12, 1957, to Arvid E. Jensen and assigned to the assignee of this invention, and the starter motor of copending application Serial No. 684,670, filed September 18, 1957, in the name of Arvid E. Jensen and assigned to the assignee of this invention.

According to the construction of the invention, a plurality of field coils are supported on the frame of the starter motor. One of the field coils is positioned about an opening in the frame, while a lever means pivotally supported on the frame has a first portion positioned adjacent the opening and a second portion positioned adjacent an armature shaft pinion. The rest of the field coils are wound and connected so that a majority of the magnetic poles created thereby, when the starter is first energized, are of opposite polarity to the magnetic pole created by the field coil positioned about the opening in the frame. When the first portion of the lever means moves into the opening in the frame due to the magnetic field created about the opening and the pinion is moved on the armature shaft into engagement with an engine turning means, means are actuated for establishing the number of magnetic poles of one polarity equal to the number of magnetic poles of the opposite polarity. This arrangement provides a large magnetic force acting on the first portion of the lever means, when the starter is first energized, due to the fact that the flux path for a majority of the magnetic poles must pass through the field coil positioned about the opening, and provides a normal starting motor once the first portion of the lever means has moved into the opening and the pinion has moved into engagement with the engine turning means.

This construction also permits the armature and hence the armature shaft pinion to slowly rotate to facilitate its engagement with the engine turning means while the first portion of the lever means is being moved into the opening in the frame and the armature shaft pinion is being moved into engagement with the engine turning means.

An object of the present invention is the provision of a starter motor which utilizes the magnetic field of the field coils to actuate the engagement mechanism.

Another object of the present invention is the provision of a starter motor in which field coils are wound and connected to produce a magnetic field of high intensity about one of the field coils to aid in the actuation of the engagement mechanism.

A further object of the invention is the provision of a starter motor in which the armature shaft pinion is slowly rotated to facilitate its engagement with an engine turning means.

Other objects and advantages of the invention will become more apparent as the specification is considered in connection with the accompanying drawings in which.

Figure 1:
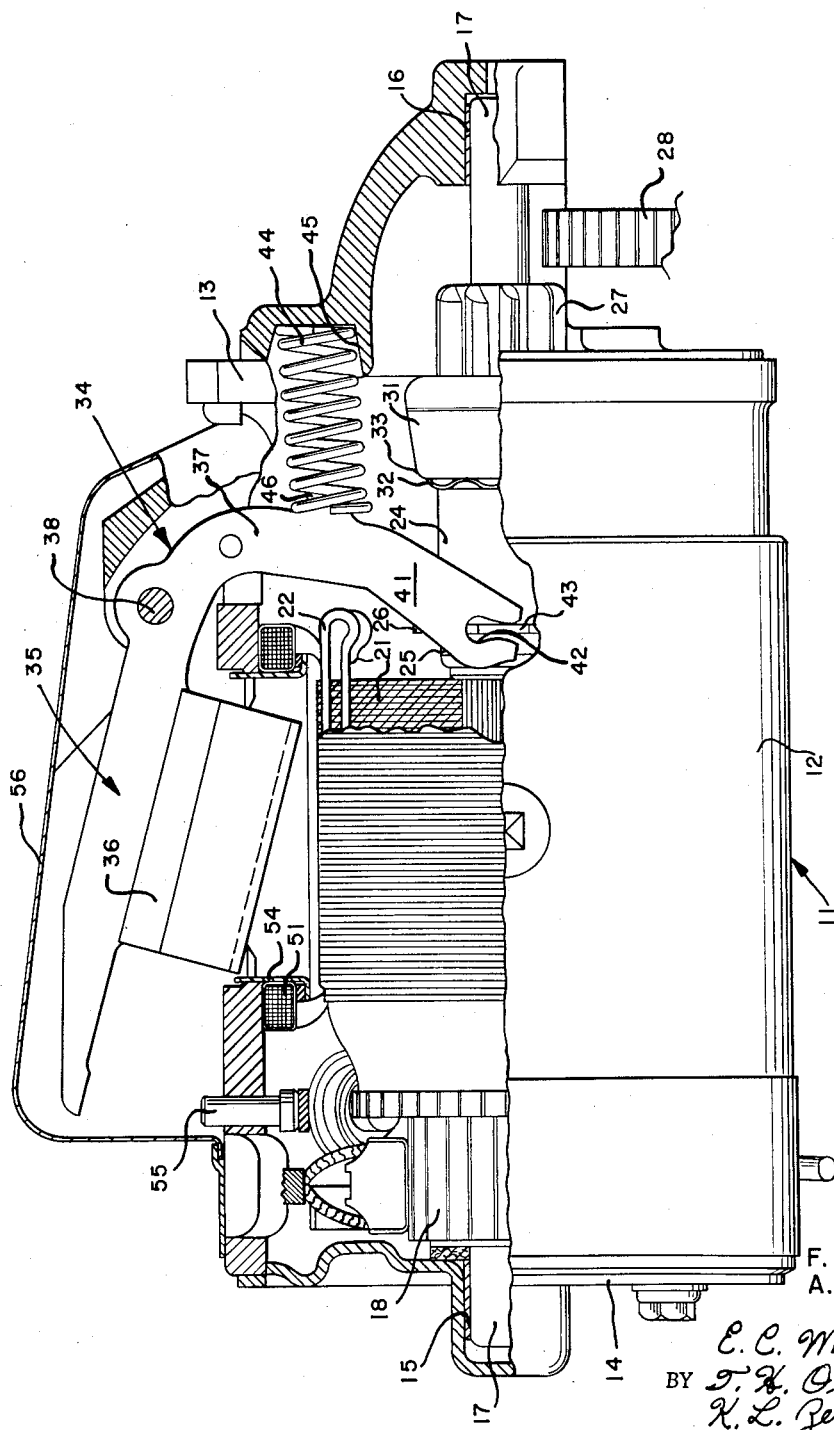
Figure 1 is a side elevational view of an embodiment of the present invention with portions in section.

Referring now to the drawings in which like reference numerals designate like parts throughout the several views thereof, there is shown in Figure 1 a starting motor generally designated by the numeral 11 having a frame 12 which includes end plates 13 and 14. The end plates carry bearings 15 and 16 in which an armature shaft 17 is rotatably mounted. Positioned upon the armature shaft is a commutator 18, a laminated armature core 21, and armature coils 22, the ends of which extend a considerable distance axially from the end of the armature core. The armature shaft is provided with a helical splined portion which terminates immediately adjacent the end of the laminated core 21. A helical splined barrel 24 is positioned over the splined portion of the armature shaft for engagement therewith. A collar 25 having a flange 26 extending radially therefrom is rotatably mounted upon said barrel, but longitudinally fixed with respect thereto. A driven means, preferably a pinion assembly 27 adapted for engagement with an engine turning means 28 such as a ring gear on the flywheel is slidably mounted on the armature shaft 17 and is rotatably driven thereby. An overrunning clutch, the external portion of which is designated by the numeral 31, is positioned between the helical splined barrel 24 and the pinion assembly 27. A spring 32 may be positioned between the helical splined barrel 24 and shoulder 33 of the overrunning clutch 31.

A lever means which may conveniently comprise a bell crank 34 and which has a first portion 35 including a plunger 36 and a second portion 37, is pivotally mounted on the frame by means of a pin 38. The lower part of the second portion 37 has a bifurcated portion which divides the second portion into two prongs, one of which is shown at 41. Each prong has a slot 42 which receives an ear 43 on the flange 26 to prevent rotation of the collar with respect to the two prongs.

The bell crank 34 is spring loaded to the position shown in Figure 1, so that the pinion 27 is disengaged from the engine turning means 28, by means of a spring 44 one end of which is positioned in a bore 45 in the end plate 13. The other end of the spring 44 fits over an ear 46 on the second portion 37 of the bell crank 34.

A field winding 51 which may conveniently comprise a series field coil 52 and a shunt or parallel field coil 53 (see Figures 2, 3 and 4) is positioned around a core 54 in an opening in the frame 12. A switch actuator 55 is positioned to be engaged by the first portion 35 of the bell crank 34 as the plunger 36 moves into the core 54 upon energization of the starter. This actuator opens a switch (see Figures 2, 3, and 4) as will be explained subsequently. A housing cap 56 fits over the first portion 35 of the lever means to prevent any foreign matter from entering the starter.

Figure 2:
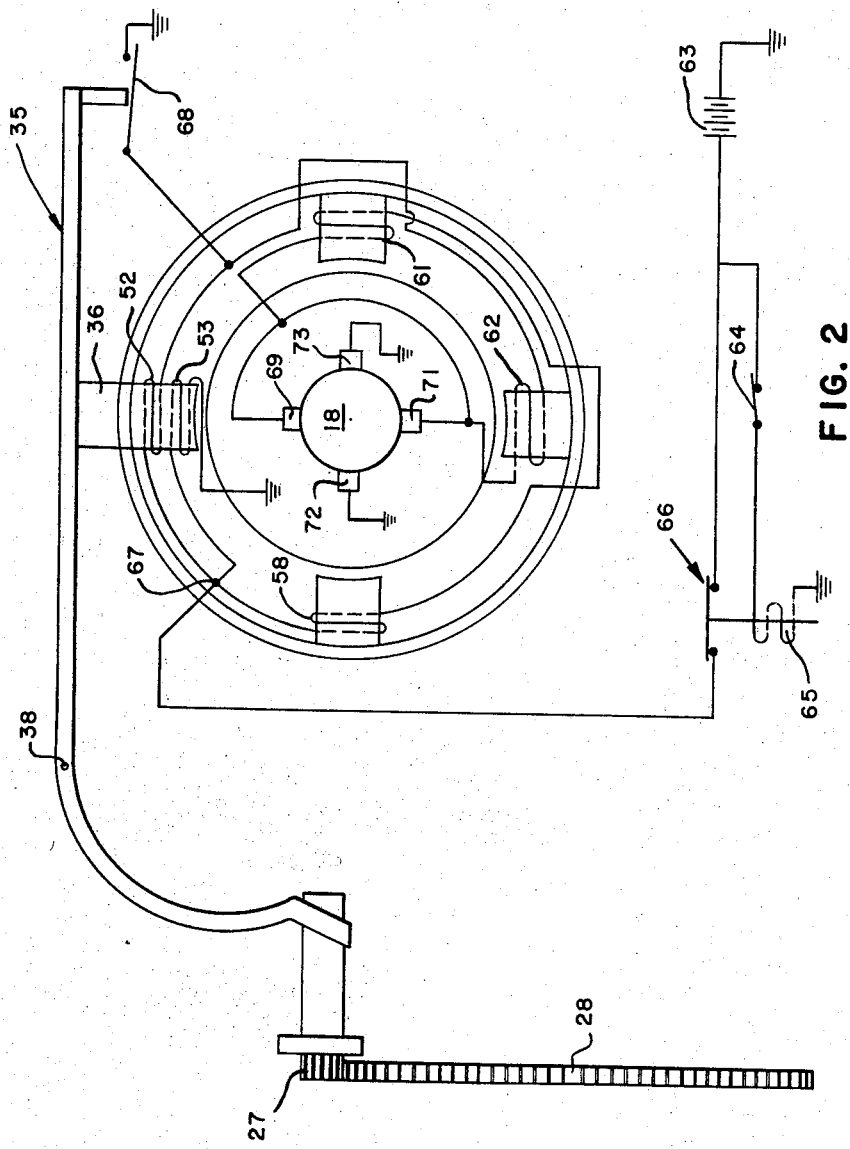
Figure 2 is a schematic of the mechanical features and the wiring arrangement of the present invention.

Referring now to Figure 2, which is a schematic of the mechanical and electrical features of the present invention in the engaged position, there is shown in addition to the series coil 52 and the shunt coil 53 three additional series coils 58, 61 and 62. All of these coils are adapted to be energized by a battery 63 by means of a starter switch 64 which, when closed, energizes a solenoid winding 65, thereby moving the armature of the solenoid 66 so that the circuit between the battery and the coils is completed.

Figure 4:
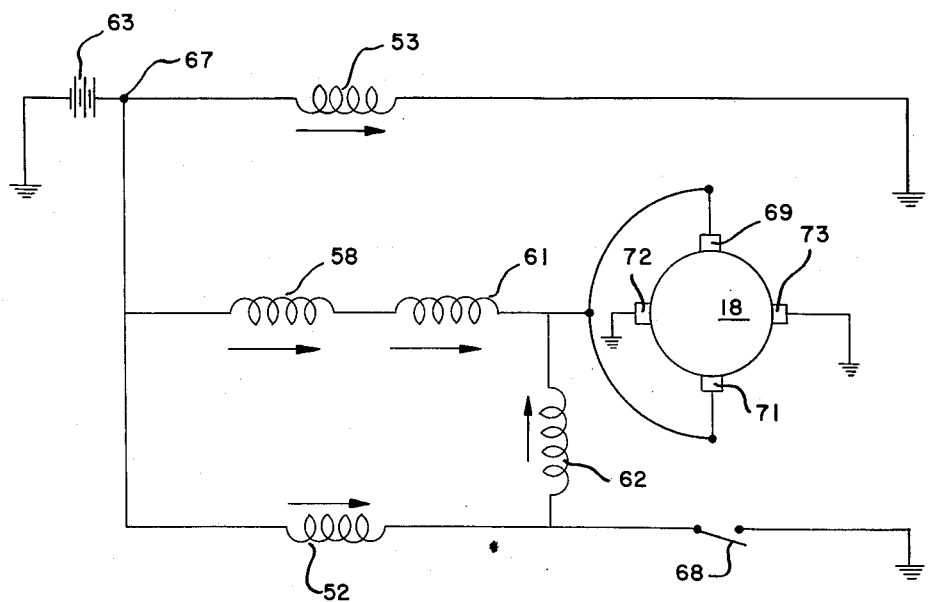
Figure 4 is a schematic wiring diagram of the present invention showing the direction of current flow after the armature pinion has become engaged with the engine turning means.

The shunt or parallel coil 53 is connected as a long shunt across the starter, that is from one terminal of the starter designated by the numeral 67 to the other terminal of the starter which may be grounded as shown. When the starter is in the fully engaged position with the switch 68 in the open position as shown in Figures 2 and 4, the two series coils 58 and 61 are connected in series, and current flows from the terminal 67, through the coil 58, through coil 61, through brushes 69 and 71, through the commutator 18 and the armature coils 22 and then to ground by way of the brushes 72 and 73. As can readily be appreciated by those skilled in the art, the two field coils 58 and 61 create magnetic poles of the same polarity facing the armature and, as illustrated in Figure 2, these are south poles. When the switch 68 is open, the two series coils 52 and 62 are connected in series and current flows from the terminal 67, through coil 52, through coil 62, through the brushes 69 and 71, through commutator 18 and armature coils 22, and then to ground by way of brushes 72 and 73. The coils 52 and 62 are wound to produce magnetic poles of the same polarity facing the armature. These poles are of opposite polarity to the magnetic poles facing the armature created by the coils 58 and 61, and as illustrated in Figure 2, are north poles. Of course, it is obvious that the magnetic polarity of the field coils 58 and 61 could be reversed so that they would produce magnetic north poles facing the armature, and that similarly the magnetic polarity of the field coils 52 and 62 could be reversed so that they produce magnetic south poles facing the armature. Thus, when the starter is in the engaged position with the switch 68 opened, the starter motor functions as any normal cumulative compound series wound machine.

Figure 3:
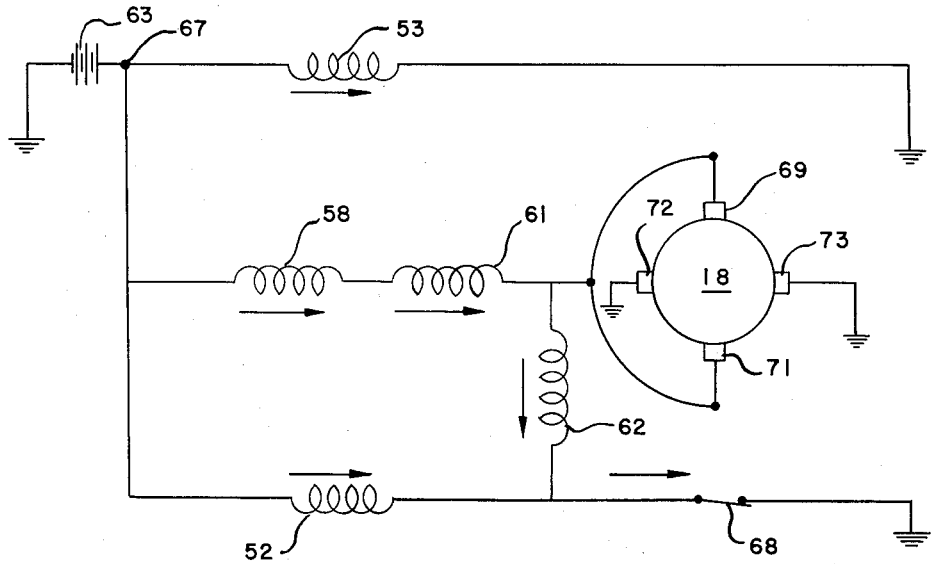
Figure 3 is a schematic wiring diagram of the present invention showing the direction of flow of current when the starter is first energized.

Figure 1 shows a partial sectional view of the starter motor of the present invention in the unengaged position and Figure 3 shows a schematic wiring diagram of the starter after the starter switch has been closed but prior to the time the switch 68 has been opened by means of the second portion 35 of the lever means and the switch actuator 55. At this time current flows from the terminal 67 through winding 52 and thence to ground through the closed switch 68 rather than to the armature through the coil 62. Current also flows from the terminal 67 through coil 58 and coil 61. After the current flows through the coil 61, it divides with part of it flowing through the brushes 69 and 71, through the commutator 18, armature coils 22 and to ground through the brushes 72 and 73. The other part of the current leaving coil 61 flows through the coil 62 to ground through the closed switch 68. It can be appreciated by a comparison of Figures 3 and 4 that when the switch 68 is closed the current flows through the coil 62 in a direction opposite to that prevailing when the switch 68 is in the open position. The polarity of the magnetic pole facing the armature created by the coil 62 is thus reversed from what it is when the starter is in the fully engaged position. This provides a majority of magnetic poles facing the armature of the opposite polarity from the pole created by the coil 52 which surrounds the opening in the frame. As illustrated, the three coils 58, 61, and 62 create magnetic fields having their south poles facing the armature, while the coil 52 aided by parallel coil 53 creates a north magnetic pole facing the armature. Thus the flux path for each of the coils 58, 61, and 62 passes through the frame in the vicinity of the opening, to create a magnetic field of high intensity about the opening.

As a result of this magnetic field, a large force is exerted on the plunger 36 to move it into the frame of the starter and to move the pinion 27 over into engagement with the engine turning means 28. As previously mentioned, the current leaving the coil 61 divides with a portion of it flowing through the coil 62 and the remainder flowing through the armature of the motor while all of the current from the coil 52 flows to ground through the closed switch 68. This causes the armature to rotate slowly to facilitate the engagement of the pinion 27 with the engine turning means 28.

Thus when the starter is first energized, the plunger 36 moves into the opening in the frame which is surrounded by the field coils 52 and 53 due to the force exerted by the magnetic field created by the field coils 58, 61, and 62 and by the field coils 52 and 53. The lever means 34 is thus rotated against the force of the spring 44 to bring the slowly rotating pinion 27 into engagement with the engine turning means 28. As can be seen by reference to Figure 1, the pinion is moved axially on the shaft as the second portion 37 of the lever means moves to the right through the collars 25, the barrel 24, the spring 32 and the overrunning clutch 31. The spring 32 serves only to cushion some of the shock if the pinion strikes the engine turning means 28 in the nonmeshing position. This spring can be made very small and can in some instances be eliminated since the pinion is slowly rotating to aid in engagement, and since the force on the plunger has not reached its peak when the end of the pinion 27 reaches the edge of the engine turning means 28.

When the pinion has become fully engaged, the first portion 35 of the lever means strikes the switch actuator 55 thus opening the switch 68. When the switch 68 is opened full battery current flows through the armature from the field coils 58 and 61 and from the field coils 52 and 62 thus supplying full cranking power to the engine turning means 28. The current through the field coil 62 is also reversed thus establishing the number of magnetic poles of one polarity facing the armature equal to the number of magnetic poles of the opposite polarity facing the armature, so that the starter motor acts as a normal cumulative compound series wound machine.

Although the invention is by no means so limited, the following values of a successfully tested starter motor are given by way of example only:

Coil 53 is constructed of 75 turns of Number 26 copper wire having a resistance of 0.24 ohm.

Coil 52 is constructed of 10 turns of Number 11 copper wire having a resistance of .0092 ohm.

Coils 58 and 61 are constructed of 8 turns of flat copper ribbon .038 x .265 inch having a resistance of .0051 ohm each.

Coil 62 is constructed of 7 turns of flat copper ribbon .056 x .265 inch having a resistance of .0031 ohm.

A conventional commercial starter motor armature having a resistance of approximately .0032 was employed.

As can readily be appreciated by an inspection of these values, approximately one-half the current leaving the coil 61 passes through the armature and the other half passes through coil 62 when the switch 68 is in the closed position.

Thus the present invention provides a reliable starter motor in which a magnetic field of high intensity is created about one of said field coils to actuate the engagement mechanism of the starter and in which the armature shaft pinion is slowly rotated to facilitate its engagement with an engine turning means.

It will be understood that the invention is not to be limited to the exact construction shown and described, but that various changes and modifications may be made without departing from the spirit and scope of the invention, as defined in the appended claims.

What is claimed is:

1. An internal combustion engine starter assembly comprising a frame, a plurality of field coils supported on said frame, an armature including an armature shaft rotatably supported in said frame, an armature shaft pinion slidably mounted on said armature shaft and rotatably driven thereby, said frame having an opening with one of said field coils being positioned about said opening, means having a first portion positioned adjacent said opening and a second portion positioned adjacent said pinion, said first portion being responsive to the magnetic field created about said opening when said starter is energized to be moved into said opening so that said second portion slides said pinion along said armature shaft, said field coils being wound and connected to create, when said starter is first energized, a majority of poles facing said armature of opposite polarity to the magnetic pole facing said armature created by the field coil positioned about said opening, and means operable when the first portion of said first mentioned means moves into said opening and the second portion thereof moves said pinion on said shaft for establishing the number of magnetic poles of one polarity facing said armature equal to the number of magnetic poles of the opposite polarity facing said armature.

2. An internal combustion engine starter assembly comprising a frame, a plurality of field coils supported on said frame, an armature including an armature shaft rotatably supported in said frame, an armature shaft pinion slidably mounted on said armature shaft and rotatably driven thereby, said frame having an opening with one of said field coils being positioned about said opening, a lever mechanism having a first portion positioned adjacent said pinion and a second portion positioned adjacent said opening, said field coils being wound and connected to create a majority of magnetic poles facing said armature of opposite polarity to the magnetic pole facing said armature created by the field coil positioned about said opening when said starter is first energized, and means actuated when said second portion of said lever mechanism is moved into the opening in said frame and said first portion of said lever mechanism moves said pinion axially on said shaft for establishing the number of magnetic poles of one polarity facing said armature equal to the number of magnetic poles of the opposite polarity facing said armature.

3. An internal combustion engine starter assembly comprising a frame, a plurality of field coils supported on said frame, an armature including an armature shaft rotatably supported in said frame, an armature shaft pinion slidably mounted on said armature shaft and rotatably driven thereby, means having a first portion positioned adjacent one of said field coils and a second portion positioned adjacent said pinion, said first portion being actuated by the magnetic field created by said field coils when said starter is energized so that said second portion slides said pinion on the armature shaft, said field coils being wound and connected to create, when said starter is first energized, a majority of magnetic poles facing said armature of opposite polarity to the magnetic pole facing said armature created by the field coil positioned adjacent the first portion of said means, and means operable when the first portion of said first mentioned means is actuated and the second portion thereof moves said pinion on said shaft for establishing the number of magnetic poles of one polarity facing said armature equal to the number of magnetic poles of the opposite polarity facing said armature.

4. An internal combustion engine starter assembly comprising a motor having a plurality of field coils, driven means coupled to said motor, means actuated by the magnetic field of said field coils for engaging said driven means with an engine turning means when said starter is energized, said field coils being wound and connected to create, when said starter is first energized, a majority of magnetic poles facing said armature of one polarity, and means operable when said means actuated by the magnetic field of said field coils engages said driven means with said engine turning means for establishing the number of magnetic poles of one polarity facing said armature equal to the number of magnetic poles of the opposite polarity facing said armature.

5. An internal combustion engine starter assembly comprising a motor having a plurality of field coils, driven means coupled to said motor, means actuated by the magnetic field of said field coils for engaging said driven means with an engine turning means when said starter is energized, said field coils being wound and connected to create, when said starter is first energized, a majority of magnetic poles facing said armature of one polarity, and means operable when said means actuated by the magnetic field of said field coils engages said driven means with said engine turning means for reversing the current through one of said field coils.

6. An internal combustion engine starter assembly comprising a frame, a plurality of field coils supported on said frame, an armature, an armature shaft supporting said armature and being rotatably mounted in said frame, an armature shaft pinion slidably mounted on the armature shaft and rotatably driven thereby, said frame having an opening with one of said field coils being positioned about said opening, a lever having one end adjacent said pinion and a plunger attached to the other end adjacent said opening, said field coils being wound so that a majority of said field coils create a magnetic pole of opposite polarity to that created by the field coil positioned about said opening when said starter is first energized, and means operable when the plunger moves into the opening in said frame and said pinion is moved on said shaft for reversing the current through one of said field coils.

7. An internal combustion engine starter assembly comprising a frame, a plurality of field coils supported on said frame, an armature including an armature shaft rotatably supported in said frame, an armature shaft pinion slidably mounted on said armature shaft and rotatably driven thereby, said frame having an opening with one of said field coils being positioned about said opening, means having a first portion positioned adjacent said opening and a second portion positioned adjacent said pinion, said first portion being responsive to the magnetic field created about said opening when said starter is energized to be moved into said opening so that said second portion slides said pinion along said armature shaft, the armature being shunted through a shunt including one of said field coils, said shunt being opened when the first portion of said means moves into said opening.

8. An internal combustion engine starter assembly comprising a frame, a plurality of field coils supported on said frame, an armature including an armature shaft rotatably supported in said frame, an armature shaft pinion slidably mounted on said armature shaft and rotatably driven thereby, said frame having an opening, a first series field coil positioned about said opening, means having a first portion positioned adjacent said opening and a second portion positioned adjacent said pinion, said first portion being responsive to the magnetic field created about said opening when said starter is energized to be moved into said opening so that said second portion slides said pinion along said armature shaft, a second series coil connected in series with said first series coil with the junction thereof being short circuited, a third and a fourth series field coil connected in series, current flowing from said third and fourth series of field coils through said second series field coil when said starter is first energized, said short circuit being opened when said first portion of said means moves into said opening and the second portion thereof moves said pinion on said armature shaft thereby sending current from said first series field coil through said second series field coil to said armature so that the current flowing through said second series field coil and the magnetic polarity of field created thereby are reversed.

No references cited.